May 29, 1928.                                                    1,671,617
                         J. M. SPITZGLASS
                  MULTIPLE ORIFICE FOR FLOW METERS
                     Filed Sept. 25, 1924          2 Sheets-Sheet 1

INVENTOR
Jacob M. Spitzglass
By Nissen & Crane
ATTYS.

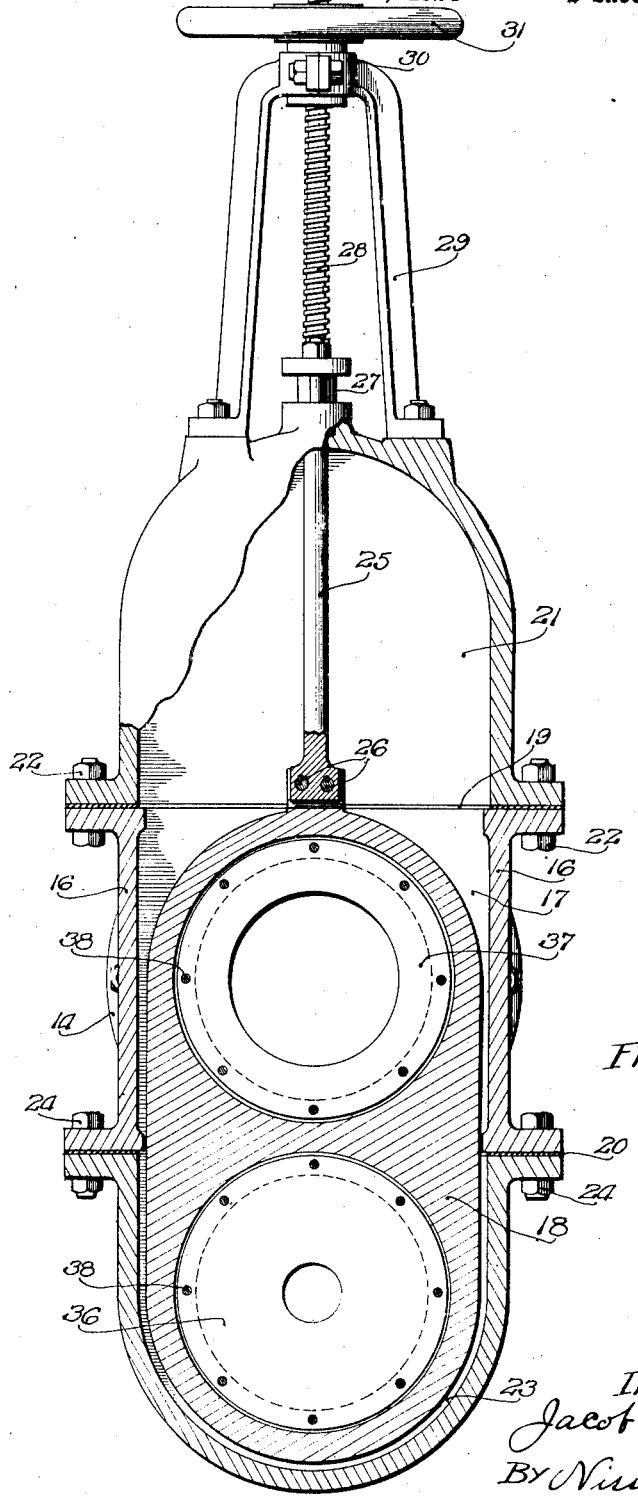

Patented May 29, 1928.

1,671,617

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

MULTIPLE ORIFICE FOR FLOW METERS.

Application filed September 25, 1924. Serial No. 739,952.

This invention relates to orifice plates interposed in a pipe line for the purpose of gauging the flow of fluid through said line and has for its object the provision of a device of the class named in which plates having different sized orifices may be readily positioned in the line as occasion requires.

The invention is exemplified in the combination and arrangement of parts shown in the accompanying drawings and described in the following specification, and it is more particularly pointed out in the appended claims.

In the drawings—

Fig. 3 is a section substantially on line 3—3 of Fig. 1.

Figures 1, 2:
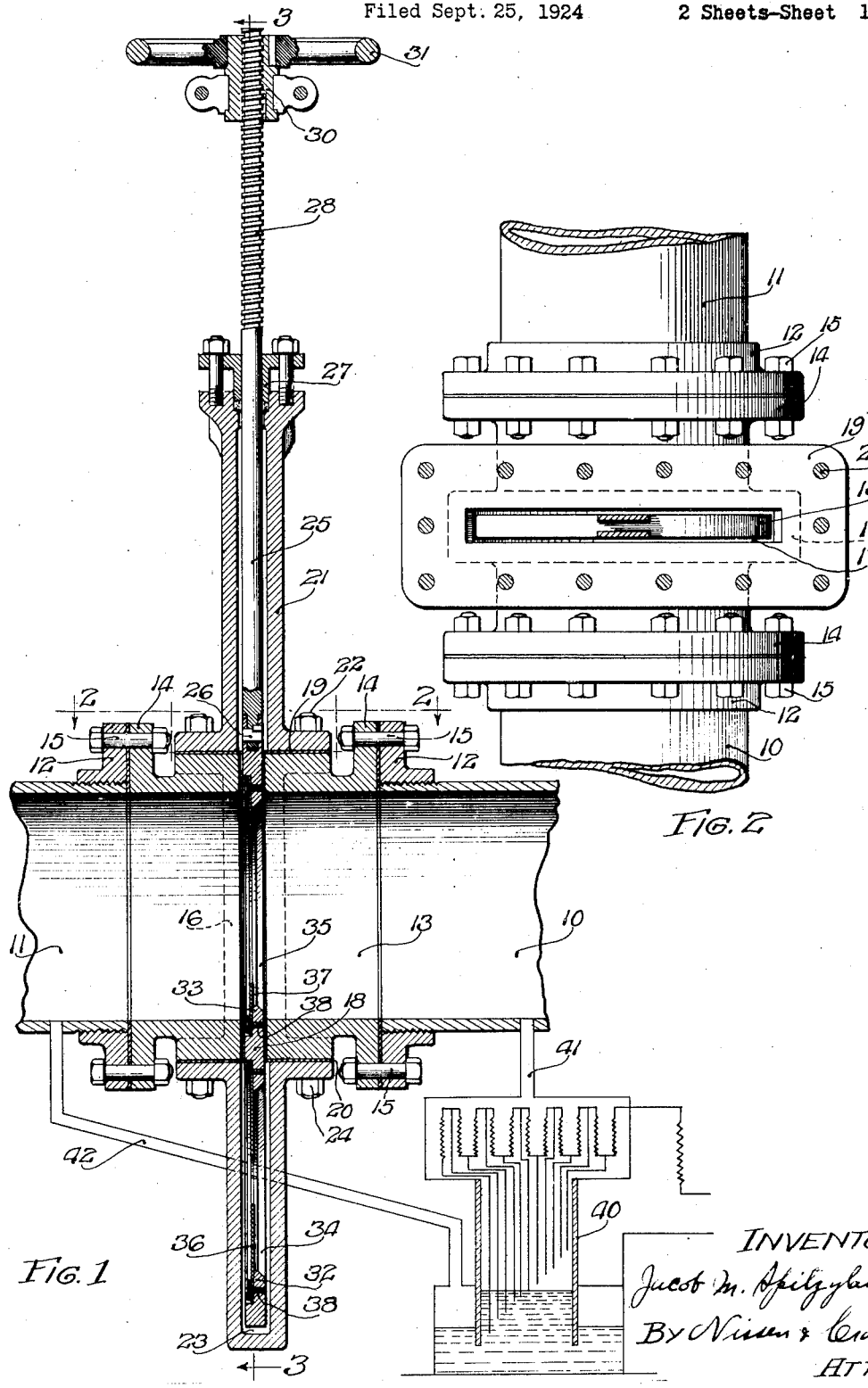
Fig. 1 is a vertical section through a pipe line showing one embodiment of the present invention applied thereto.
Fig. 2 is a section substantially on line 2—2 of Fig. 1.

One well-known method of measuring the flow of fluid in a pipe line is to interpose a plate across the line having an orifice therein of known characteristics. An instrument is then connected to the line at opposite sides of the orifice, the instrument being controlled by the differential pressure produced by the restriction in the line and being calibrated to indicate or record the rate of flow as determined by the differential pressure. Integrating mechanism may also be provided to record the quantity passing through the pipe line for any period of time.

In many installations the rate of flow of the fluid in the line varies through large ranges and it has heretofore been difficult to properly measure the flow throughout the range of variation. If an orifice of sufficient size to accommodate the maximum flow is provided the differential pressure produced by such orifice for the minimum flow will be so small as to be practically impossible to measure. Many gas companies, for instance, report a ratio between maximum and minimum flow as high as "ten to one" due to the difference in consumption on week days and Sundays. Efforts have been made to provide variable orifice plates so that the size of the orifice could be changed but all such plates have been found to involve objectionable features which render them impractical. Mechanism which changes the size of a circular orifice without materially altering its shape is necessarily complicated so as to be difficult of operation and liable to collect dirt and sediment so as to interfere with its proper use. Orifices of other than circular shape change their characteristics when their area is changed so as to interfere with their proper operation. It has therefore heretofore been necessary when changing the size of an orifice to shut off the flow of fluid and remove a section of the line for the purpose of replacing the plate. The only alternative to the interruption of the service has been to provide expensive bypasses which are prohibitive in cost. The present invention obviates all of these difficulties, as well as producing other advantages which will be apparent from the following description.

In the drawings, the numerals 10 and 11 designate adjacent ends of two sections of a pipe line provided with the usual flanges 12. An orifice housing 13 has flanges 14 at each end thereof which are secured by bolts 15 to the sections 10 and 11 in a manner well known in the art. The housing 13 is provided with laterally extending wings 16 providing a substantially rectangular slot 17 extending across the housing and open at its top and bottom. A plate 18 is disposed in the slot 17 and has a close sliding fit with the sides of the slot in the manner of a gate valve. The wings 16 are provided with seats 19 and 20 at their top and bottom, respectively, the slot 17 being open at its top and bottom through these seats. A relatively thin flat casing 21 is secured to the seat 19 by bolts 22 and a corresponding casing 23 is secured to the seat 20 by bolts 24. The plate 18 may have its ends rounded, as shown in Fig. 3, and the casings 21 and 22 may be correspondingly rounded to conform to the ends of the plate.

An operating stem 25 is secured to the upper end of the plate 18 by suitable attachments 26 and the upper end of the stem 25 extends through a stuffing box 27, the outer portion of the stem being threaded as shown at 28. A suitable pedestal 29 has an internally threaded nut 31 journaled therein, the nut being provided with a hand wheel 31 keyed to the upper portion thereof. It will be apparent that the plate 18 may be positively moved upwardly or downwardly in its slot 17 by rotation of the hand wheel 31.

The plate 18 is provided with a plurality of seats 32 and 33 surrounding openings 34 and 35, respectively. These seats and openings are preferably of the same form and size. Orifice plates 36 and 37 are removably secured to the seats 32 and 33, respectively, by screws 38. The plates 36 and 37 have central circular openings therein, the size of the openings being regulated according to the particular rate of flow for which they are designed.

A differential pressure flow meter is indicated diagrammatically at 40 in Fig. 1 of the drawings having connection pipes 41 and 42 communicating with the pipe sections 10 and 11, respectively, at opposite sides of the orifice plates. One form of instrument which may be used for this purpose is shown and described in my prior Patent No. 1,325,763, dated December 23, 1919.

The ratio of the openings in the two plates may be made to conform as closely as practical to the ratio between the rate of flow of fluid at different periods in the operation of the pipe line. If, for instance, the variation for different periods is approximately "one to ten" the areas of the orifices may be made to have a corresponding ratio. If at any time it is desired to change either of the orifice plates to a plate having a different sized opening, this may be done without in any way interrupting the service. If, for instance, it is desired to change the lower orifice plate, the plate 18 may be moved into the position shown in the drawings, and when the parts are in this position the lower casing 23 may be removed simply by removing the bolts 24. The upper plate 37 will continue to operate without interrupting the flow of fluid in the line in any way while this change is being made. When the casing 23 has been removed the plate 36 may be readily exchanged for another plate having the desired sized opening, after which the casing 23 is replaced and the apparatus is again in condition to permit the newly installed orifice plate to be moved upwardly into operating position.

If it is desired to change the upper plate, the slide 18 is moved upwardly to bring the orifice plate 36 into operative position. The upper casing 21 will then be removed and the plate 37 replaced by another plate having a different sized orifice. The slide 18 will, of course, be equipped with plates having appropriate orifices for the usual operation of the pipe line, but the invention provides easy means for replacing these plates with others having different sized orifices if change in operating conditions or other circumstances makes a change in the plates desirable.

I claim:—

1. In combination, a conduit having a transversely extending slideway disposed therein and opening at opposite sides of said conduit, housings registering with the openings of said slideway, a slide plate movable in said slideway through said openings and in a straight path inclosed in said housings and conduit, a plurality of orifice plates carried by said slide and movable therewith through said openings into and out of registration with said conduit, and a member secured to said slide plate and projecting outside of said housing for moving said slide plate.

2. In combination, a conduit having a transversely extending slideway interposed between portions thereof and opening at diametrically opposite sides of said conduit, housings registering with the openings for said slideway, a plate having a plurality of spaced openings therethrough arranged in said slideway, removable orifice plates secured to said slide plate in registration with the openings therein, and a threaded member for moving said slide plate to selectively position the orifice plates thereon in registration with said conduit, said orifice plates being disposed in one or the other of said housings when not in position in said conduit, said housings being removable to permit replacement of said orifice plates while said orifice plates are disposed without said conduit.

3. The combination with two registering conduit sections, of a connecting section interposed between said conduit sections, said connecting section having lateral slots opening therefrom at diametrically opposite sides thereof, housings, each having an opening at one side thereof registering with one of said slots, said housings being separably and tightly connected with the wall of said connecting section about said slots, a slide movable through said slots, and a plurality of orifice plates carried by said slide.

4. The combination with a pair of conduit sections having spaced registering ends, of a connecting section interposed between said spaced sections and connected to said ends to hold said ends in fixed position relative to each other, said connecting section having a slideway therethrough provided with slots at opposite sides thereof, housing members having openings registering with said slots, said housing members having tight connection with the wall of said connecting section about said slots, and a slide having a plurality of orifice plates movable through said slots.

5. The combination with a pair of conduit sections having spaced registering ends, of a connecting section interposed between said ends and secured thereto, said connecting section having a slideway extending transversely of said conduit sections and having opposite laterally opening slots, closed housing members having openings registering with said slots and forming tight connection about said slots, a slide movable in said slideway, a plurality of orifice plates mounted in said slide, an operating rod connected with said slide and extending through the wall of one of said housings, means for forming a tight connection between said operating rod and wall, and means disposed outside said housing for moving said operating rod.

6. The combination with a pair of pipe sections having spaced registering ends, of a connecting section interposed between said ends and secured thereto to hold said ends in fixed position relative to each other, said connecting section having a slideway extending transversely to said conduit sections and having oppositely disposed slots communicating with said slideway, separate relatively flat housings having openings registering with said slots, said housings having tight connection with the wall of said connecting section about said slots, a slide movable in said slideway and through said slots, a plurality of different sized orifice plates carried by said slide, an operating rod connected with said slide and extending through the wall of one of said housings, a stuffing box for forming a tight connection between said rod and housing, and a threaded member engaging threads on said operating rod outside of said housing for moving said operating rod.

In testimony whereof I have signed my name to this specification on this 22d day of September, A. D. 1924.

JACOB M. SPITZGLASS.